(12) United States Patent
Bleys et al.

(10) Patent No.: US 7,307,136 B2
(45) Date of Patent: *Dec. 11, 2007

(54) POLYURETHANE ELASTOMERS

(75) Inventors: Gerhard Jozef Bleys, Heverlee (BE); Alan James Hamilton, Leefdaal (BE); Jan Willem Leenslag, Tremelo (BE)

(73) Assignee: Huntsman International LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/061,186

(22) Filed: Feb. 4, 2002

(65) Prior Publication Data

US 2002/0103325 A1   Aug. 1, 2002

Related U.S. Application Data (63) Continuation of application No. 08/761,617, filed on Dec. 5, 1996, now abandoned.

(30) Foreign Application Priority Data

Dec. 8, 1995   (EP) ................................. 95203405

(51) Int. Cl.
*C08G 18/48* (2006.01)
*C08G 18/76* (2006.01)
*C08J 9/04* (2006.01)

(52) U.S. Cl. .................... 528/67; 521/159; 521/160; 521/174; 521/175; 521/176; 521/914; 528/59; 528/60; 528/65; 528/76; 528/77

(58) Field of Classification Search ................ 521/159, 521/160, 174, 175, 176, 914; 528/59, 60, 528/65, 67, 76, 77
See application file for complete search history.

(56) References Cited

U.S. PATENT DOCUMENTS

| 3,983,094 | A | * | 9/1976 | O'Shea ..................... 528/76 |
|---|---|---|---|---|
| 4,101,439 | A | | 7/1978 | Russell et al. ............... 528/65 |
| 4,124,572 | A | | 11/1978 | Mao .......................... 528/76 |
| 4,312,973 | A | | 1/1982 | Critchfield et al. .......... 528/75 |
| 4,379,904 | A | | 4/1983 | Ehrlich et al. .............. 528/65 |
| 4,436,869 | A | | 3/1984 | Zipp et al. .................. 525/51 |
| RE31,671 | E | | 9/1984 | Bonk et al. ................. 528/65 |
| 4,524,102 | A | | 6/1985 | Hostettler ................... 521/115 |
| 4,554,340 | A | | 11/1985 | Heusch et al. .............. 528/77 |
| 4,767,825 | A | | 8/1988 | Pazos et al. ................ 525/408 |
| 5,001,167 | A | | 3/1991 | Wiltz et al. |
| 5,075,408 | A | | 12/1991 | Suzuki et al. .............. 528/76 |
| 5,418,261 | A | | 5/1995 | Helsemans et al. ........ 521/174 |
| 5,459,170 | A | | 10/1995 | Bleys et al. ................ 521/125 |
| 5,591,779 | A | | 1/1997 | Bleys et al. ................ 521/137 |
| 6,245,825 | B1 | * | 6/2001 | Bleys ......................... 521/159 |
| 6,884,824 | B2 | * | 4/2005 | Bleys et al. ................ 521/159 |

FOREIGN PATENT DOCUMENTS

| DE | 31 13 690 | | 10/1982 |
|---|---|---|---|
| EP | 547765 | * | 6/1993 |
| JP | 61-238816 | * | 10/1986 |
| JP | H03-177413 | | 8/1991 |

OTHER PUBLICATIONS

G. Festel, "Dissertation", (Jun. 1995), pp. 1-5, 7-13, 78, 131-141, 215-217, 223.
Kunststoff Handbuch 7, "Polyurethane", (Sep. 1983), p. 4.
Vulkollan, Bayer publication, (Aug 1989) pp. 6,7, 11, 19, 22-23.
Bergmann-Schaeffer, 1975, pp. 232-244.
European Standard EN ISO 6721-2, 1996.
International Standard ISO 6721-5, 1996, "Plastics—Determination of dynamic mechanical properties—Part 5: Flexural vibration—Non-resonance Method".

\* cited by examiner

*Primary Examiner*—Rabon Sergent
(74) *Attorney, Agent, or Firm*—Ron D. Brown; Robert Holthus (57) ABSTRACT

A polyisocyanate-based elastomer having a ratio of the storage modulus (E') at 20° C. and the storage modulus (E') at 120° C. of between 0.75 and 1.5, a tan δ at 100° C. of less than 0.1 and a maximum value of the tan δ of more than 0.8, the tan δ being the ratio of the loss modulus (E") and the storage modulus (E').

17 Claims, 6 Drawing Sheets

FIGURE 6

POLYURETHANE ELASTOMERS

This is a Continuation of U.S. application Ser. No. 08/761,617 filed Dec. 5, 1996, now abandoned. The entire contents of which are hereby incorporated in their entirety by reference.

The present invention relates to novel polyurethane elastomers and a method for the preparation thereof.

Polyurethane elastomers are made by reacting diisocyanates, such as toluene diisocyanate (TDI), 1,5 naphthalene diisocyanate (NDI) or 4,4' diphenylmethane diisocyanate (4,4'-MDI), with high molecular weight polyols, such as polyester polyols or polyether polyols, and low molecular weight polyols or polyamines, such as ethylene glycol or butane diol.

High molecular weight polyether polyols mainly used are polytetrahydrofuran or polypropyleneoxide.

The preparation of elastomeric polyurethanes from polyether polyols containing minor amounts of ethylene oxide (EO)-groups is also known, see for example EP-A-13487.

Formulations comprising high amounts of 4,4'-MDI and polyether polyols having high EO-contents have already been used to prepare flexible polyurethane foams, see for example EP-A-547764, EP-A-547765 and EP-A-549120.

None of the known isocyanate-based elastomers however shows satisfactory dynamic modulus behaviour over a broad temperature range.

A new class of polyurethane elastomers has now been found which show a quasi-perfect elastomeric behaviour over a broad temperature range.

Thus, the present invention relates to polyisocyanate-based elastomers having a ratio of the storage modulus (E') at 20° C. and the storage modulus (E') at 120° C. of between 0.75 and 1.5, a tan δ at 100° C. of less than 0.1 and a maximum value of the tan δ of more than 0.8, the tan δ being the ratio of the loss modulus (E") and the storage modulus (E').

Preferably, the maximum value of the tan δ is more than 1.0.

The ratio of the storage modulus (E') at 20° C. and the storage modulus (E') at 120° C. is preferably between 0.8 and 1.2, and most preferably between 0.85 and 1.1.

It is preferred to have a tan δ at 100° C. of less than 0.05. Most preferably the tan δ at 100° C. is less than 0.03.

The prime maximum of the tan δ preferably occurs at a temperature below 0° C., most preferably below −10° C.

The storage and loss modulus are measured by Dynamic Mechanical Thermal Analysis (DMTA measured according to ISO/DIS 6721-5).

These novel polyurethane elastomers can be made from formulations containing polyols having high oxyethylene contents or polyol blends containing polyester polyols and high concentrations of polyols having high oxyethylene contents, substantially pure 4,4'-MDI or a derivative thereof, and a low molecular weight chain extender and optionally a crosslinking agent.

Thus, according to the invention, there is also provided a method for the preparation of polyurethane elastomers from a reaction mixture comprising a polyisocyanate component, a polyol composition, a chain extender and optionally a crosslinking agent wherein the polyisocyanate component contains at least 85% by weight of 4,4'-diphenylmethane diisocyanate or a variant thereof, the polyol composition comprises at least one polyoxyalkylene polyol containing oxyethylene residues, said polyol composition having an average nominal hydroxyl functionality of from 2 to 4, an average hydroxyl equivalent weight of from 500 to 7000 and an average oxyethylene content of between 50 and 85% by weight, and the chain extender has an average hydroxyl equivalent weight of up to 250.

The polyisocyanate component used in the invention may be any aromatic or aliphatic polyisocyanate such as TDI, NDI or pure 4,4'-diphenylmethane diisocyanate or mixtures of that diisocyanate with one or more other organic polyisocyanates, especially other diphenylmethane diisocyanate isomers, for example the 2,4'-isomer optionally in conjunction with the 2,2'-isomer. The polyisocyanate component may also be an MDI variant derived from a polyisocyanate composition containing at least 85% by weight of 4,4'-diphenylmethane diisocyanate. MDI variants are well known in the art and, for use in accordance with the invention, particularly include liquid products obtained by introducing uretonimine and/or carbodiimide groups into said polyisocyanate composition and/or by reacting with one or more polyols.

Preferred as the polyisocyanate component are polyisocyanate compositions containing at least 90% by weight of 4,4'-diphenylmethane diisocyanate. Polyisocyanate compositions containing at least 95% by weight of 4,4'-diphenylmethane diisocyanate are most preferred.

The polyol composition may consist of one or more polyether polyols optionally blended with other polyols, such as polyester polyols.

The composition may comprise a single polyoxyalkylene polyol which preferably is a poly(oxyethylene-oxypropylene) polyol having the required functionality, equivalent weight and oxyethylene content. Such polyols are known in the art and may be obtained in conventional manner by reacting ethylene and propylene oxides simuiltaneously and/or sequentially in any order with an initiator such as water, a polyol, a hydroxylamine, a polyamine and the like having from 2 to 4 active hydrogen atoms.

Alternatively, the polyol composition may comprise a mixture of two or more polyoxyalkylene polyols such that the total composition has the required average functionality, equivalent weight and oxyethylene content. The polyoxyalkylene polyols present in such mixtures are preferably poly(oxyethylene-oxypropylene) polyols but one or more polyoxyethylene polyols and/or polyoxypropylene polyols may also be present.

Preferred polyether polyol compositions comprise:
(a) from 75 to 100% by weight of a first polyol component comprising at least one polyoxyalkylene polyol containing oxyethylene residues, said polyol component having an average nominal hydroxyl functionality of from 2 to 4, an average hydroxyl equivalent weight of from 1000 to 5000 and an average oxyethylene content of from 60 to 85% by weight, and
(b) from 25 to 0% by weight of another polyol component.

Polyol component (b) suitably has an average functionality of from 2 to 4, an average equivalent weight of 1000 to 3000 and may be, for example, a polyoxypropylene polyol, a polyoxyethylene polyol or a poly(oxyethylene-oxypropylene) polyol containing less than 60% or more than 85% by weight of oxyethylene residues.

The term "average nominal hydroxyl functionality" is used herein to indicate the average functionality (number of hydroxyl groups per molecule) of the polyol composition on the assumption that the average functionality of the polyoxyalkylene polyols present therein is identical with the average functionality (number of active hydrogen atoms per molecule) of the initiator(s) used in their preparation although in practice it will often be somewhat less because of some terminal unsaturation.

It is preferred that the average nominal hydroxyl functionality of the polyol composition is from 2 to 3.

If desired, the polyoxyalkylene polyol (or one or more of the polyoxyalkylene polyols when a mixture is used) may contain dispersed polymer particles. Such polymer modified polyols have been fully described in the prior art and include products obtained by the in situ polymerisation of one or more vinyl monomers, for example acrylonitrile and styrene, in polyoxyalkylene polyols or by the in situ reaction between a polyisocyanate and an amino-or hydroxy-functional compound, for example triethanolamine, in the polyoxyalkylene.

Also suitable as polyol (b) are polyester polyols.

Polyester polyols which may be used include hydroxyl-terminated reaction products of polyhydric alcohols such as ethylene glycol, propylene glycol, diethylene glycol, dipropylene glycol, 1,4-butanediol, bis(hydroxyethyl) terephthalate, glycerol, trimethylolpropane, hexanediol, neopentyl glycol, methylpentane diol, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof.

Preferred polyesters have a number average molecular weight of 750-4000, especially 750-2500, and an average nominal functionality of 2-3.

Suitable chain extenders include low molecular weight diols, aminoalcohols or diamines such as ethylene glycol, diethylene glycol, dipropylene glycol, tripropylene glycol, propanediol, butanediol, pentanediol, hexanediol, 3-methyl-pentane-1,5-diol, ethanolamine or diethyltoluenediamine.

Low molecular weight isocyanate-reactive compounds having an average functionality of 3 or more, such as glycerol, pentaerythritol or triethanolamine, may be added as crosslinking agents.

It is preferred to add small amounts of water, most preferably less than 2% by weight based on the total weight of the isocyanate-reactive, to the formulation. The isocyanate-index of the reaction system, taking account of the polyol composition, water and any other isocyanate-reactive species, for example chain extenders and opt. crosslinking agents, may be as low as 85 or as high as 120. Preferably, the isocyanate index is between 90 and 110. The most preferred isocyanate-index is between 95 and 105.

The elastomer-forming reaction mixture may contain one or more of the additives conventional to such reaction mixtures. Such additives include catalysts, for example tertiary amines and tin compounds, surface-active agents and foam stabilisers, for example siloxane-oxyalkylene copolymers, flame retardants, organic and inorganic fillers, pigments, and internal mould release agents.

The invention furthermore provides a reaction system comprising:

(a) a polyisocyanate component containing at least 85% by weight of 4,4'-diphenylmethane diisocyanate or a variant thereof;

(b) a polyol composition comprising at least one polyoxyalkylene polyol containing oxyethylene residues, said polyol composition having an average nominal hydroxyl functionality of from 2 to 4, an average hydroxyl equivalent weight of from 500 to 7000 and an average oxyethylene content of between 50 and 85% by weight;

(c) a chain extender having an average hydroxyl equivalent weight of up to 250, and optionally, (d) water, (e) a crosslinking agent, and (f) one or more additives conventional to elastomer formulations.

This reaction system is used for making polyurethane elastomers.

In operating the method of the invention, the known one-shot, semi-prepolymer or full prepolymer techniques may be applied together with mixing equipment conventionally used in the preparation of elastomers.

The elastomers according to the invention are particularly suitable for use in applications where good energy-absorbing and fatigue properties are required and a good elastomeric behaviour over a broad temperature range, e.g. in the automotive and footwear industry.

The invention is illustrated by the following examples in which all parts, percentages and ratios are by weight.

The following glossary of materials is included to identify reaction components not otherwise identified in the examples.

| GLOSSARY | |
|---|---|
| Polyisocyanate I: | pure 4,4'-MDI (Suprasec MPR; commercially available from Imperial Chemical Industries PLC; Suprasec is a trademark of ICI PLC). |
| Polyisocyanate II: | uretonimine-modified MDI (Suprasec 2020; commercially available from Imperial Chemical Industries PLC). |
| Polyisocyanate III: | MDI-based prepolymer (Suprasec 2433; commercially available from Imperial Chemical Industries PLC) |
| Polyisocyanate IV: | isocyanate prepolymer made by reacting polyisocyanate I and polyol B (NCO-content = 8.66%). |
| Polyol A: | EO/PO triol having 70% random EO-groups; OH-value-of 42 mg KOH/g and about 45% primary OH-groups. |
| Polyol B: | EO/PO diol having 75% random EO-groups and OH-value of 27 mg KOH/g. |
| Polyol C: | 70/30 blend of an EO/PO diol (22% EO-tip; OH-value = 35 mg KOH/g) and an EO/PO triol (15% EO-tip; OH-value = 32 mg KOH/g). |
| Polyol D: | polymer-modified polyol (glycerol-initiated polyol having OH-value = 34 mg KOH/g; 15% EO-tip; 75% primary OH-groups and containing 20% styrene-acrylonitrile copolymer particles). |
| Polyol E: | EO/PO diol having 27% EO-tip and OH-value of 30 mg KOH/g. |
| Catalyst 1: | Dabco EG; commercially available from Air Products. |
| Catalyst 2: | Niax A1; commercially available from Union Carbide. |
| EG: | ethylene glycol |

EXAMPLES

Examples 1, 2, 3 and 4 and Comparative Examples 1 and 2

Elastomers were bench mixed and moulded in a 15×10×1 cm mould in a conventional manner using the formulations given in Table I and the properties indicated in Table I were measured.

TABLE I

|  | 1 | 2 | 3 | 4 | Comp. 1 | Comp. 2 |
|---|---|---|---|---|---|---|
| Polyisocyanate I | 36.4 | 42.7 | — | — | — | — |
| Polyisocyanate II | — | — | 46.8 | — | — | 42.9 |
| Polyisocyanate III | — | — | — | — | 109 | — |
| Polyisocyanate IV | — | — | — | 100 | — | — |
| Polyol A | 100.0 | 50.0 | — | — | — | — |
| Polyol B | — | 50.0 | 100.0 | — | — | — |
| Polyol C | — | — | — | — | 100.0 | — |
| Polyol D | — | — | — | — | 28.3 | — |
| Polyol E | — | — | — | — | — | 100.0 |
| Ethylene glycol | 5.0 | 7.0 | 7.0 | 4.55 | 8.9 | 6.0 |
| Water | 0.3 | 0.3 | 0.3 | 0.21 | 0.6 | 0.3 |
| Catalyst 1 | 1.0 | 0.5 | 1.0 | 0.7 | 2.6 | 1.0 |
| Catalyst 2 | — | — | — | — | 0.4 | — |
| Moulded density (kg/m$^3$) | 450 | 440 | 440 | 580 | 490 | 585 |
| Hardness | 46 (Asker C) | 51 (Asker C) | 41 (Asker C) | 62 (Asker C) | 47 (Shore A) | N.M.* |
| E' (20° C.)/E' (120° C.) ratio | 0.95 | 1.01 | 0.98 | 0.86 | 1.69 | 2.19 |
| tan δ (100° C.) | 0.002 | 0.013 | 0.024 | 0.005 | 0.070 | 0.078 |
| tan δ$_{max}$ (temperature in ° C.) | −23 | −26 | −11 | −11 | −43 | −45 |
| tan δ$_{max}$ (value) | 1.08 | 0.86 | 1.01 | 1.22 | 0.42 | 0.37 |

*N.M. = not measured
The E' (20° C.)/E (120° C.) ratio of the elastomers according to the comparative examples is higher than 1.5 and their maximum value of the tan δ is less than 0.8.

DMTA-Test

Measurements were carried out according to ISO/DIS 6721-5 on a Rheometric Scientific DMTA apparatus using a 3-point bending method. Sample test dimensions were: length 1.0 cm, width 1.3 cm, thickness 0.4 cm. Applied strain amplitude 64×10$^{-4}$ cm, frequency 1 Hz, heating rate 2° C./min. The elastomer samples were pre-conditioned at 23° C./50% RH for 24 hours prior testing. The elastomer samples were quenched to −120° C. (cooling rate 8.5° C./min) and held at that temperature for 5 minutes before heating of the sample was started.

Figure 1:
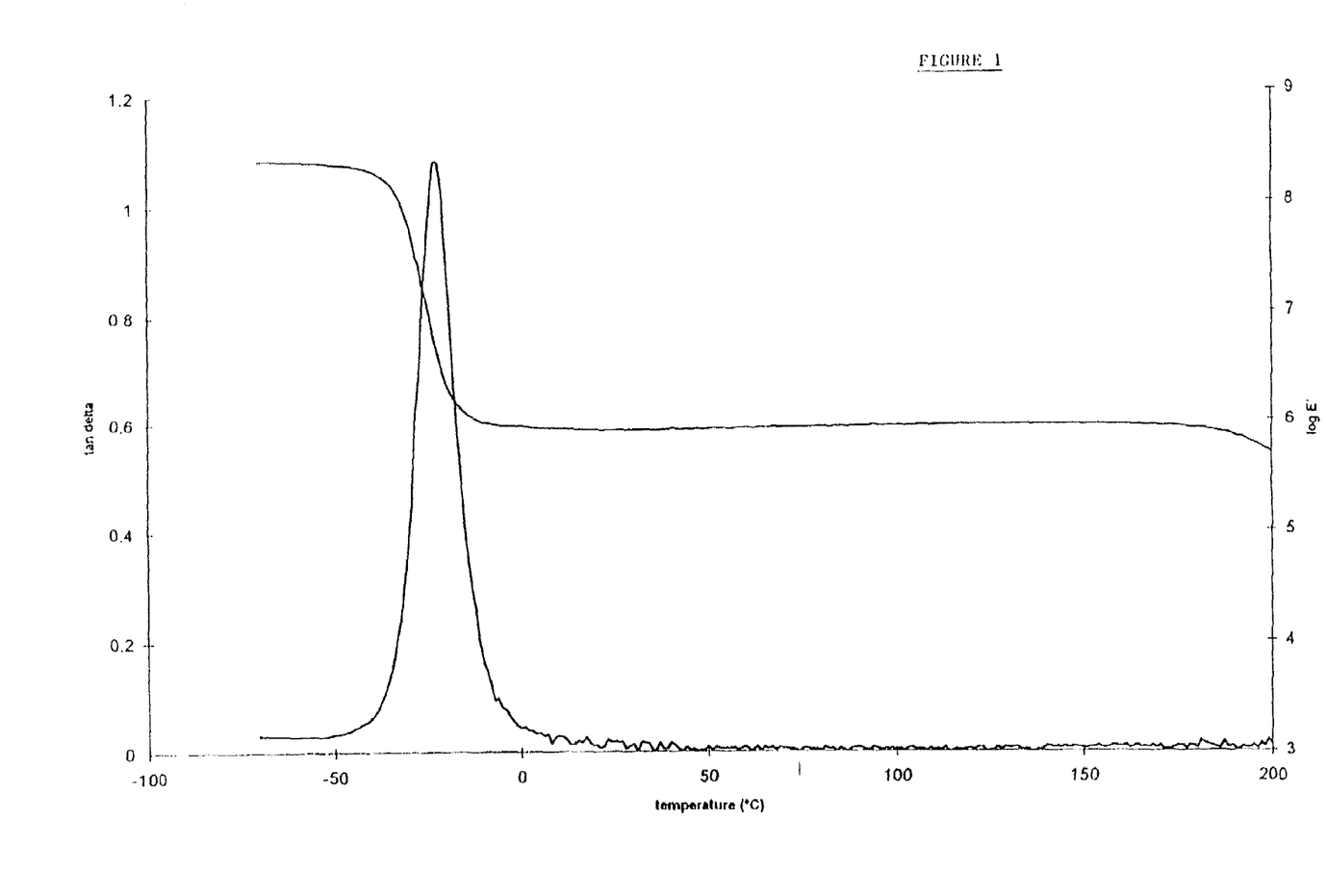
FIG. 1 is a graph depicting the Dynamic Mechanical Thermal Analysis curve of Example 1.
Figure 2:
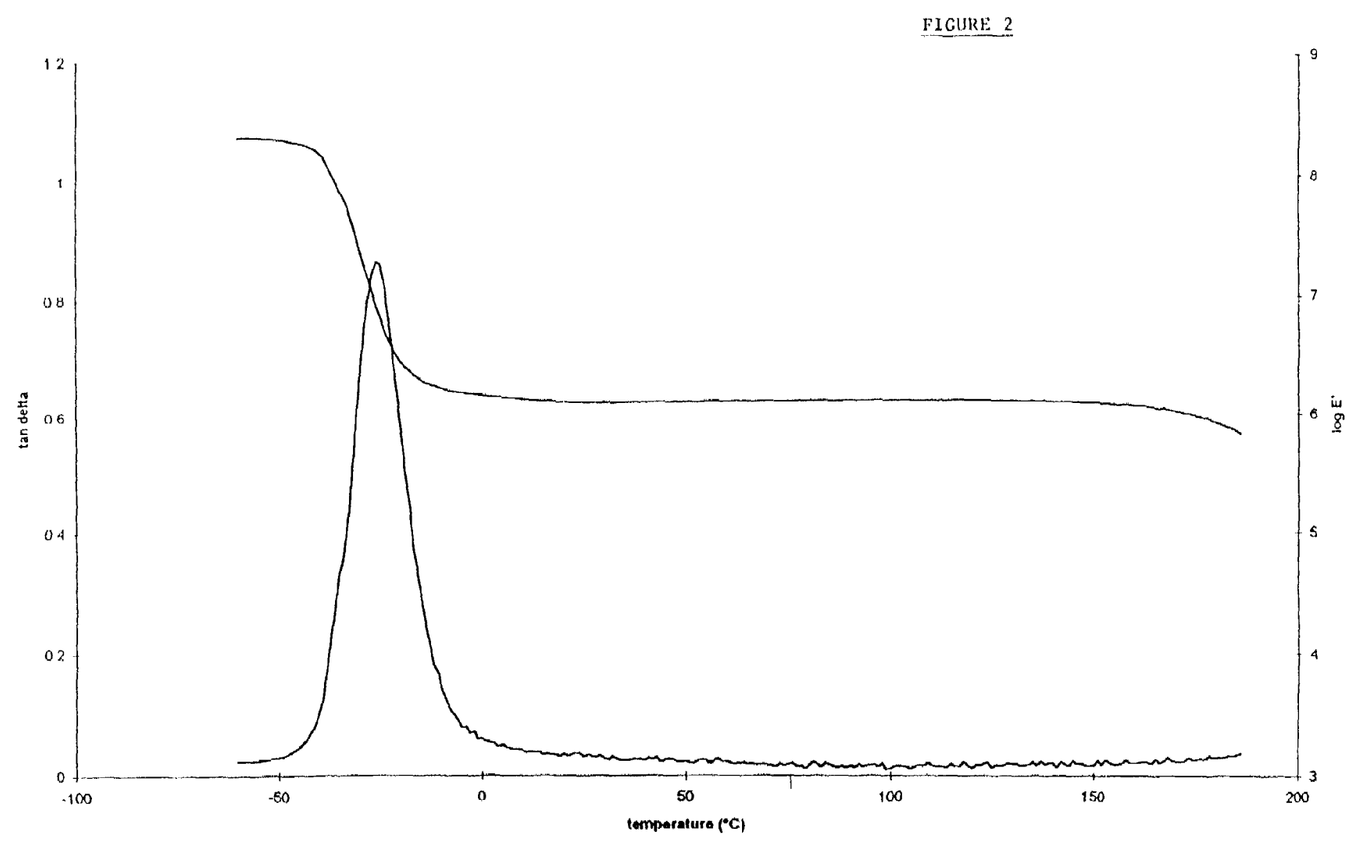
FIG. 2 is a graph depicting the Dynamic Mechanical Thermal Analysis curve of Example 2.
Figure 3:
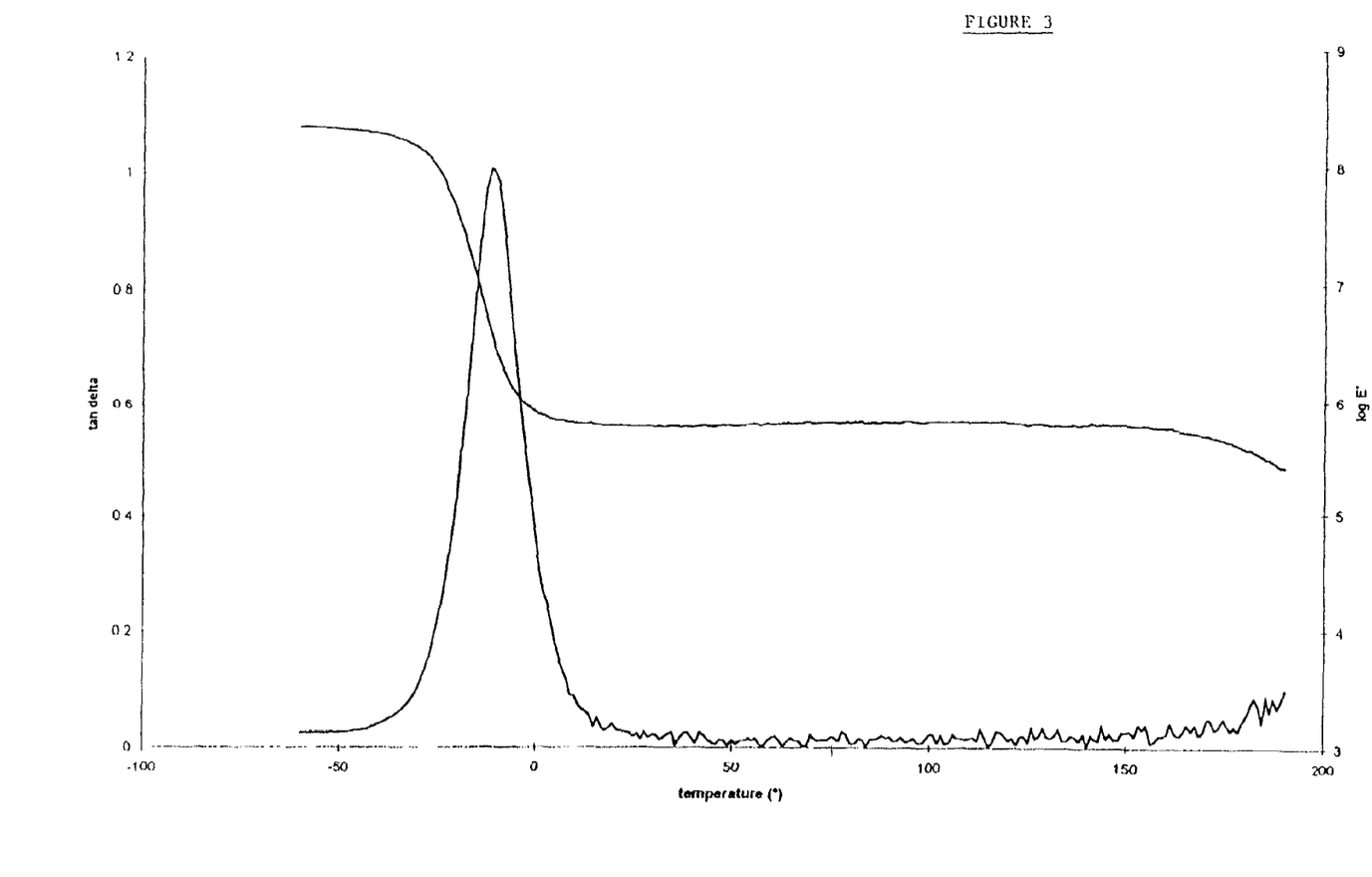
FIG. 3 is a graph depicting the Dynamic Mechanical Thermal Analysis curve of Example 3.
Figure 4:
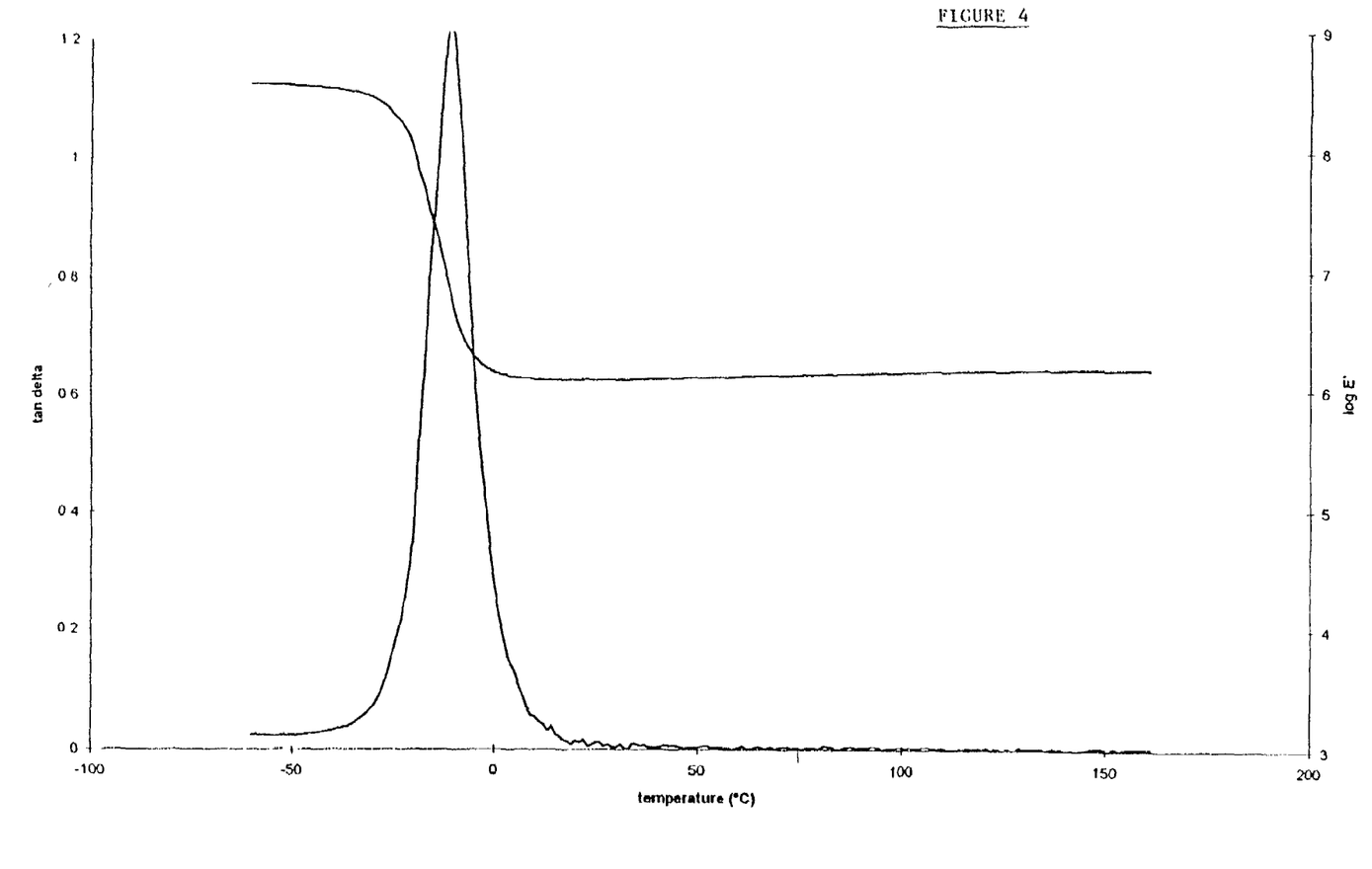
FIG. 4 is a graph depicting the Dynamic Mechanical Thermal Analysis curve of Example 4.
Figure 5:
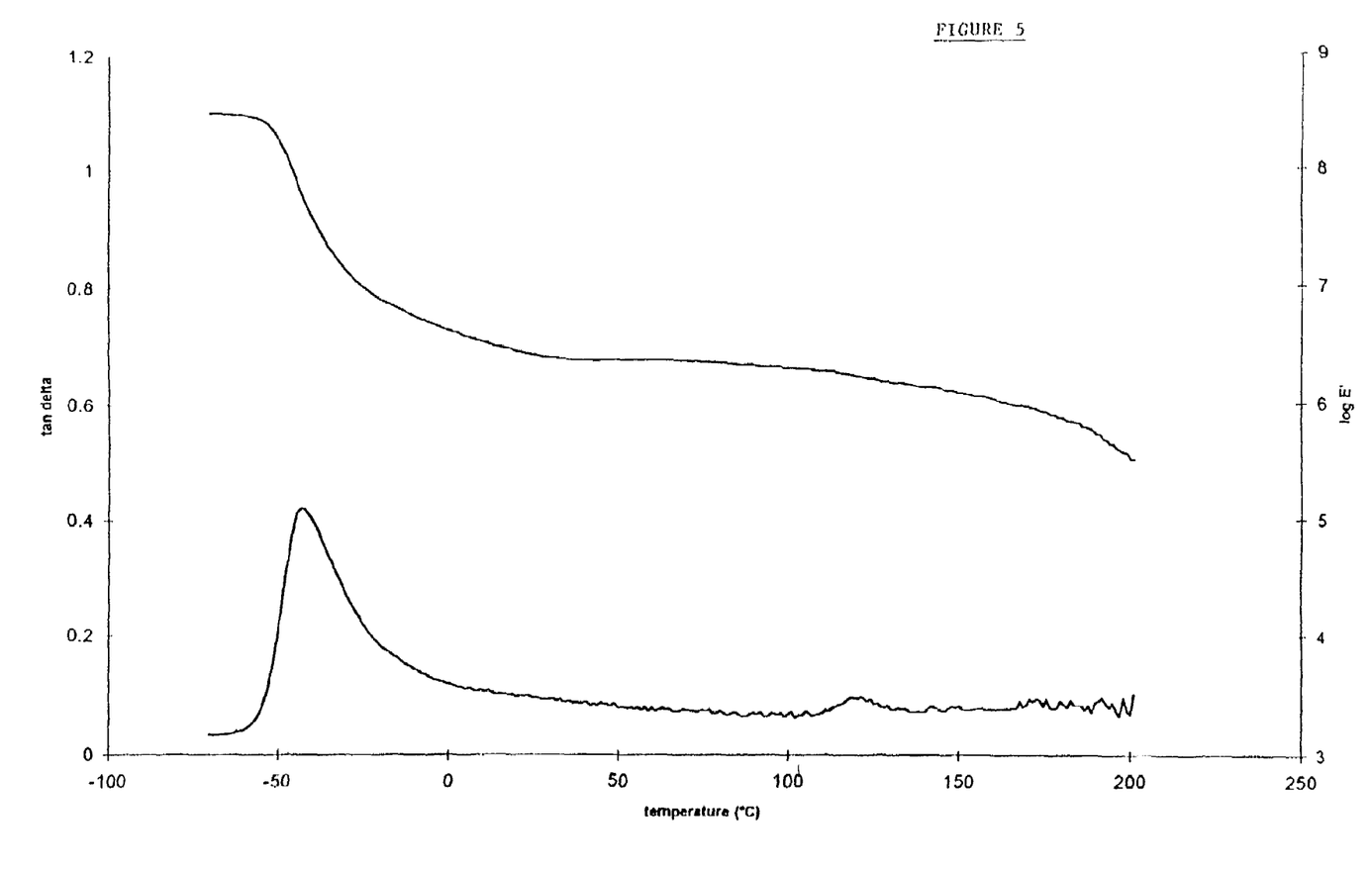
FIG. 5 is a graph depicting the Dynamic Mechanical Thermal Analysis curve of Comparative Example 1.
Figure 6:
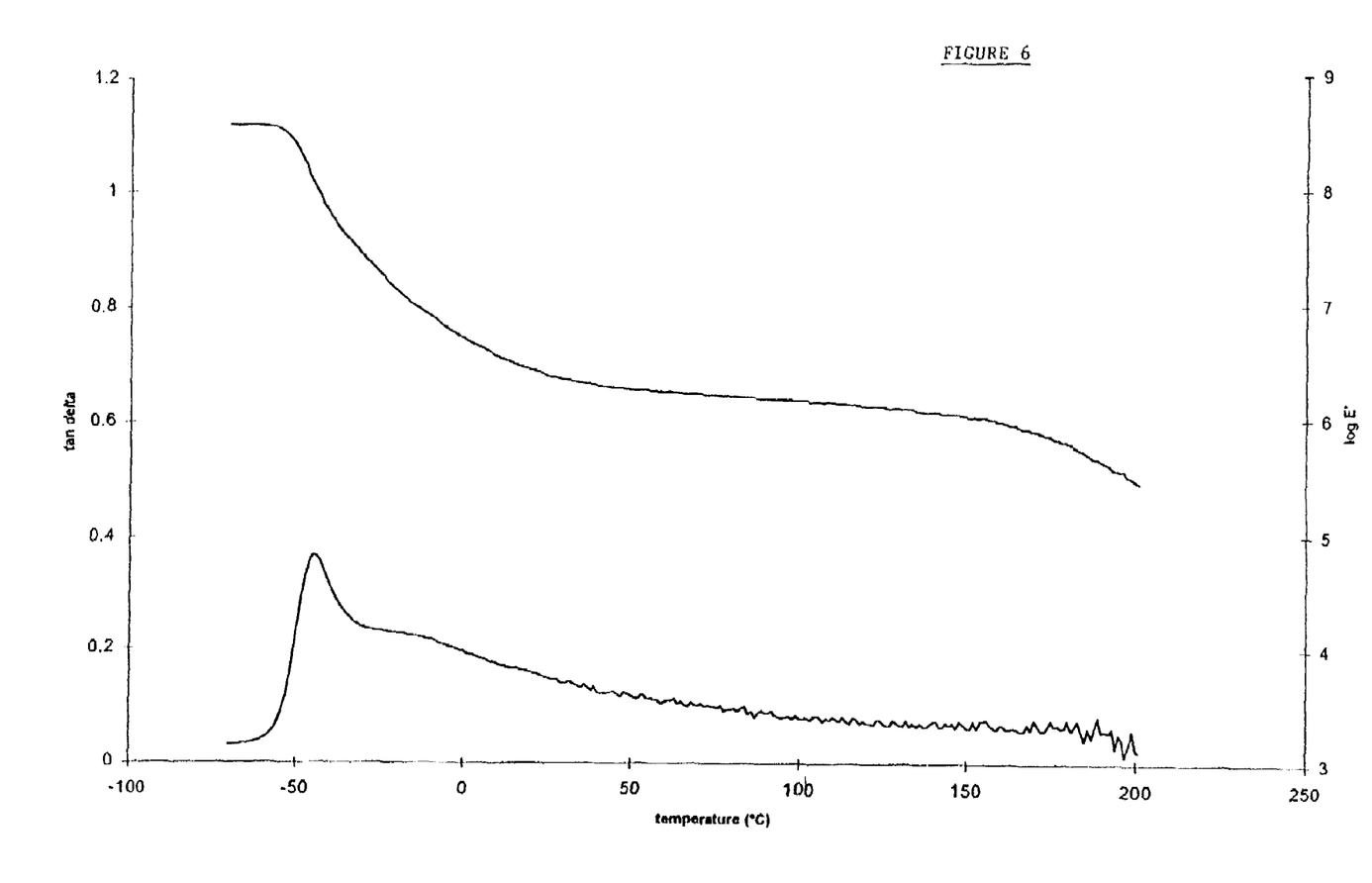
FIG. 6 is a graph depicting the Dynamic Mechanical Thermal Analysis curve of Comparative Example 2.

FIGS. 1-4 show the DMTA-curves of the examples 1-4. The DMTA-curves of the comparative examples 1 and 2 are shown in FIGS. 5 and 6.

The invention claimed is:

1. An elastomer having a ratio of the storage modulus (E') at 20° C. and the storage modulus (E') at 120° C. of between 0.75 and 1.5, a tan δ at 100° C. of less than 0.1 and a maximum value of the tan δ of more than 0.8, the tan δ being the ratio of the loss modulus (E") and the storage modulus (E'), the storage and loss modulus being measured by Dynamic Mechanical Thermal Analysis according to ISO/DIS 6721-5, wherein the elastomer is made from a reaction mixture comprising a polyisocyanate component, a polyol composition, a chain extender and optionally a crosslinking agent wherein the polyisocyanate component contains at least 85% by weight of 4,4'-diphenylmethane diisocyanate or a variant thereof derived from a polyisocyanate composition containing at least 85% by weight of 4,4'-diphenylmethane diisocyanate, the polyol composition comprises at least one polyoxyalkylene polyol containing oxyethylene residues, said polyol composition having an average nominal hydroxyl functionality of from 2 to 4, an average hydroxyl equivalent weight of from 500 to 7000 and an average oxyethylene content of between 50 and 85% by weight, and the chain extender has an average hydroxyl equivalent weight of up to about 250.

2. The elastomer according to claim 1, wherein the polyisocyanate contains at least 90% by weight of 4,4'-diphenylmethane diisocyanate.

3. The elastomer according to claim 1, wherein the polyisocyanate contains at least 95% by weight of 4,4'-diphenylmethane diisocyanate.

4. The elastomer according to claim 1 having a ratio of the storage modulus (E') at 20° C. and the storage modulus (E') at 120° C. of between 0.8 and 1.2.

5. The elastomer according to claim 1 having a ratio of the storage modulus (E') at 20° C. and the storage modulus (E') at 120° C. of between 0.85 and 1.1.

6. The elastomer according to claim 1 having a tan 67 at 100° C. of less than 0.05.

7. The elastomer according to claim 1 having a tan 67 at 100° C. of less than 0.03.

8. The elastomer according to claim 1 having a maximum value of the tan 67 of more than 1.0.

9. The elastomer according to claim 1 having the prime maximum value of the tan 67 at a temperature below 0° C.

10. The elastomer according to claim 1 having the prime maximum value of the tan 67 at a temperature below −10° C.

11. A method for the preparation of an elastomer comprising reacting a polyisocyanate component, a polyol composition, a chain extender and optionally a crosslinking agent wherein the polyisocyanate component contains at least 85% by weight of 4,4'-diphenylmethane diisocyanate or a variant thereof derived from a polyisocyanate composition containing at least 85% by weight of 4,4'-diphenylmethane diisocyanate, the polyol composition comprises at least one polyoxyalkylene polyol containing oxyethylene residues, said polyol composition having an average nominal hydroxyl functionality of from 2 to 4, an average hydroxyl equivalent weight of from 500 to 7000 and an average oxyethylene content of between 50 and 85% by weight, and the chain extender has an average hydroxyl equivalent weight of up to about 250; and wherein said elastomer has a ratio of the storage modulus (E') at 20° C. and the storage modulus (E') at 120° C. of between 0.75 and 1.5, a tan δ at 100° C. of less than 0.1 and a maximum value of the tan δ of more than 0.8, the tan δ being the ratio of the loss modulus (E') and the storage modulus (E'), the storage and loss modulus being measured by Dynamic Mechanical Thermal Analysis according to ISO/DIS 6721-5.

12. A method according to claim 11, wherein the polyol composition comprises at least one poly(oxyethylene-oxypropylene) polyol.

13. A method according to claim 11, wherein the polyol composition comprises:

a. from 75 to 100% by weight of a first polyol component comprising at least one polyoxyalkylene polyol containing oxyethylene residues, said polyol component having an average nominal hydroxyl functionality of from 2 to 4, an average hydroxyl equivalent weight of from 1000 to 5000 and an average oxyethylene content of from 60 to 85% by weight, and b. from 25 to 0% by weight of another poiyol component.

14. A method according to claim 11, wherein the polyol composition has an average nominal hydroxyl functionality of from 2 to 3.

15. A method according to claim 11, wherein the reaction mixture further comprises water.

16. A method according to claim 15, wherein the amount of water is less than 2% by weight based on the total weight of the isocyanate-reactive compounds.

17. A method according to claim 11, which is carried out at an isocyanate-index of between 90 and 110.

* * * * *